(No Model.)

W. S. RICHARDSON.
FASTENER FOR GLOVES.

No. 566,699. Patented Aug. 25, 1896.

WITNESSES

INVENTOR
William S. Richardson

UNITED STATES PATENT OFFICE.

WILLIAM S. RICHARDSON, OF BOSTON, MASSACHUSETTS.

FASTENER FOR GLOVES.

SPECIFICATION forming part of Letters Patent No. 566,699, dated August 25, 1896.

Application filed March 19, 1896. Serial No. 583,883. (No model.)

*To all whom it may concern:*

Be it known that I, WILLIAM S. RICHARDSON, a citizen of the United States, residing at Boston, in the county of Suffolk and State of Massachusetts, have invented a new and useful Improvement in Fasteners for Gloves and other Articles, of which the following is a full, clear, and exact description, reference being had to the accompanying drawings, forming a part of this specification, in explaining its nature.

The invention relates to a fastener for gloves and other articles. It has two members, one of which is a ball and the other a ball-holder or socket, and the invention has to do with the latter member. This socket or ball-holder comprises a spring center which is shaped and held both to form the entrance to the socket-cavity and also the yielding grip or retainer for the ball and a holder for supporting and attaching said wire section of the device, and which preferably is provided with a cap.

Figure 1:
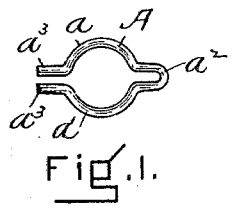
Figure 4:
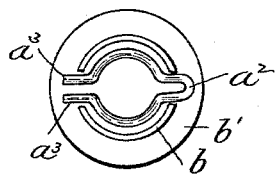
Figure 3:
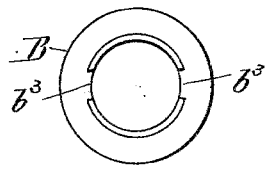
Figure 2:
Figure 5:
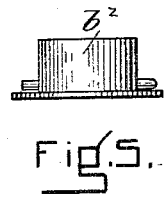
Figure 7:
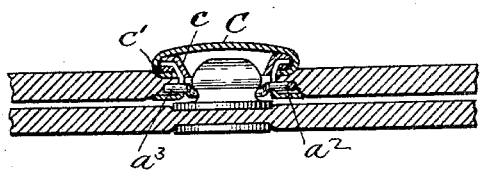
Figure 6:
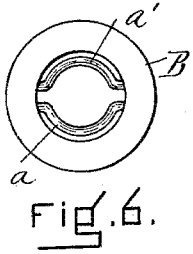
Figure 8:
Figure 9:
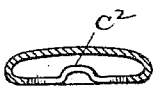

In the drawings, Figure 1 is a view in plan of the wire section. Fig. 2 is a view in side elevation thereof. Fig. 3 is a view in plan of the holder therefor. Fig. 4 is a view in plan, showing the holder and wire section as associated together. Fig. 5 is a view in elevation of said parts so connected. Fig. 6 is a view in plan thereof. Fig. 7 represents the socket member as engaged by the ball member. Figs. 8 and 9 represent a modification in the form of the cap, to which reference is hereinafter made.

A represents the wire section of the socket member of the fastener. It is formed from one piece of wire of the desired length, which is shaped or bent to produce the yielding sides $a\ a'$, which together form the ring or opening to the socket, and the ball grip or grasping device. It is also shaped or formed to provide the connected ears $a^2$ at one end of the opening or ring and the disconnected ears $a^3$ at the other end thereof. These ears extend laterally from arms bearing an angular relation to the plane of the ring, the arms preferably diverging and the ears extending outwardly or on a plane parallel with the plane of the ring from the ends of said arms. These angular arms provide means whereby the said yielding sides $a\ a'$ are brought into an exposed position in relation to the opening to the holder B, and the ears $a^2\ a^3$ serve to lock or secure the ring in the mouth $b$ of said holder upon a line with or below its flange $b'$. The said holder B has a barrel $b^2$, from which sections are cut away or removed to form the recesses $b^3$, (see Fig. 3,) and these recesses may extend to the inner surface of the flange, as represented in Fig. 5, and are of a width slightly greater than that of the ears, in order to permit their lateral movement, and especially that of the ears $a^3$ in relation to each other. These recesses may extend to the flange $b'$ or not, as desired, and when they do the ears $a^2\ a^3$ rest upon the sections of the barrel at the inner ends of the recesses. The parts thus shaped may be directly secured to the article or thing upon which the fastener is used by forming a hole therein, inserting the barrel of the holder into said hole, and turning the outer edge of the barrel upon the surface of the material or thing opposite that against which the flange $b'$ bears.

The holder may have in addition a cap, and in Fig. 7 I have shown it as so provided. This cap C has an anvil $c$, upon which the outer edge of the barrel is turned, and a flange $c'$, which may be integral with the cap or formed by a separate collet, and upon which said edge of the barrel is turned by the anvil.

In fastening the cap to the material, and also the holder thereto, it is desirable that the ears of the ring or socket-piece should not be restricted or bound by the pressing of the material too hard upon them, and when this is the case, and when necessary to provide relief in this direction, the cap may have formed in its collet or flange at the points where it covers or is in line with the ears the recesses $c^2$, which are adapted to receive the material and prevent it from being forced upon the ears.

The ears $a^2\ a^3$ may be upon the under surface of the fabric or thing to which the fastener is secured or upon the upper surface thereof immediately beneath the cap, in which case the diverging arms would be longer than when held upon the under surface of the material.

Having thus fully described my invention, I claim and desire to secure by Letters Patent of the United States—

1. In a fastener of the character specified, the combination of the wire entrance and holding section A provided with a circular opening and having ears $a^2$, $a^3$ with a holder B, having a flange $b'$ and a barrel $b^2$ provided with recesses $b^3$ which receive the ears $a^2$, $a^3$, as and for the purposes described.

2. The combination in a socket member of a fastener of a wire entrance and holding section A provided with ears $a^2$, $a^3$ disposed in relation thereto as specified, the holder B having a barrel $b^2$ provided with recesses $b^3$ to receive and hold said ears $a^2$, $a^3$ and a cap C having an anvil $c$ and a flange $c'$, as and for the purposes described.

3. In a fastener of the character specified, the combination of the wire entrance and holding section A provided with ears $a^2$, $a^3$, its holder B to which it is attached as specified, and a cap provided with recesses in line with the said ears, as and for the purposes described.

WILLIAM S. RICHARDSON.

Witnesses:
F. F. RAYMOND, 2d,
J. M. DOLAN.